United States Patent
Quiros Araya et al.

(10) Patent No.: US 11,003,517 B2
(45) Date of Patent: May 11, 2021

(54) DEVICE-BASED ENGINEERING SYSTEM FOR PROGRAMMABLE LOGIC CONTROLLERS

(71) Applicant: Siemens Aktiengesellschaft, Munich (DE)

(72) Inventors: Gustavo Arturo Quiros Araya, Princeton, NJ (US); Georg Muenzel, Yardley, PA (US); Swen Elpelt, Belle Mead, NJ (US); Kai Liu, Heroldsberg (DE); Jörg Neidig, Nuremberg (DE); Andreas von Schwerin, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/491,308

(22) PCT Filed: Mar. 9, 2018

(86) PCT No.: PCT/US2018/021722
§ 371 (c)(1),
(2) Date: Sep. 5, 2019

(87) PCT Pub. No.: WO2018/169778
PCT Pub. Date: Sep. 20, 2018

(65) Prior Publication Data
US 2020/0034218 A1    Jan. 30, 2020

Related U.S. Application Data

(60) Provisional application No. 62/472,021, filed on Mar. 16, 2017.

(51) Int. Cl.
*G06F 9/54* (2006.01)
*G06F 9/455* (2018.01)
(Continued)

(52) U.S. Cl.
CPC .......... *G06F 9/546* (2013.01); *G05B 19/056* (2013.01); *G06F 9/45558* (2013.01);
(Continued)

(58) Field of Classification Search
None
See application file for complete search history.

(56) References Cited

U.S. PATENT DOCUMENTS

| | | | |
|---|---|---|---|
| 10,360,159 B1* | 7/2019 | Black | G06F 12/128 |
| 2014/0026145 A1* | 1/2014 | Canedo | G06F 9/48 718/105 |

(Continued)

OTHER PUBLICATIONS

International Search Report dated Jun. 18, 2018; International Application No. PCT/US2018/021722; Filing Date: Mar. 9, 2018; 15 pages.

(Continued)

*Primary Examiner* — Umut Onat

(57) ABSTRACT

A system for configuration and control of a device includes a device processor includes at least two processing cores. Device firmware executes on a first processing core and a device-based engineering server executes on a second processing core. A web server running on the device-based engineering server includes a webApp providing web-based functionality for configuration and control of the device. The webApp is downloaded from the web server to the user's browser. A hypervisor manages communication between the device firmware and the device-based engineering server. A communication path established in the hypervisor for communicating a configuration or control instruction to the device firmware. The configuration or control instruction is initiated by a user via a web browser. The users web browser may run on a computer workstation that does not otherwise meet processing requirements of an engineering system for the device.

19 Claims, 4 Drawing Sheets

(51) Int. Cl.
   *G06F 16/958* (2019.01)
   *G05B 19/05* (2006.01)
(52) U.S. Cl.
   CPC ............ *G06F 9/541* (2013.01); *G06F 16/972* (2019.01); *G05B 2219/13144* (2013.01); *G05B 2219/15011* (2013.01); *G06F 2009/45579* (2013.01)

(56) References Cited

U.S. PATENT DOCUMENTS

2016/0091882 A1   3/2016  Ludwig et al.
2016/0127167 A1*  5/2016  Chou .................. H04L 41/0226
                                                                  709/223

OTHER PUBLICATIONS

Ramon Barth et al: "Multi Core in der Automation", Jan. 1, 2007 (Jan. 1, 2007), XP055482591 / Jan. 1, 2007.
Siemens: "SIMATIC S7-1500 Software Controller CPU 1505S, CPU 1507S" Jan. 1, 2014 (Jan. 1, 2014), XP055482349 / Jan. 1, 2014.

\* cited by examiner

DEVICE-BASED ENGINEERING SYSTEM FOR PROGRAMMABLE LOGIC CONTROLLERS

CROSS-REFERENCE TO RELATED APPLICATION

This application is a national phase filing under 35 U.S.C. § 371 of International Patent Application No. PCT/US2018/021722, filed Mar. 9, 2018, which claims the benefit of priority to U.S. Provisional Patent Application Ser. No. 62/472,021, filed Mar. 16, 2017, which are incorporated herein by reference in their entirety.

TECHNICAL FIELD

This application relates to programmable logic controllers (PLCs). More particularly, this application relates to design and programming of PLC systems.

BACKGROUND

PLCs are dedicated devices used for automation and production systems as well as critical infrastructure. These devices perform several types of tasks where critical real time control tasks must not be disturbed by other non-real time and non-critical tasks. PLCs are commonly configured, programmed, and commissioned (e.g., "engineered") using specialized software known as an "Engineering System" (ES). The ES usually runs on a desktop or portable computer and communicates with the PLC via a dedicated cable or through wired (and recently, wireless) networks. Also, the ES usually stores files with configuration information for the PLC (e.g., communication connections, programs, parameters) locally in the workstation computer.

With reference to FIG. 4, a block diagram is provided showing present art solutions for engineering systems, which presents several limitations. First, the workstation computer 430 must meet the minimum processing requirements for the ES 420, including disk space and processor capability. Because these requirements are frequently high, expensive high-end computers are required for engineering tasks and the ability to use lower cost, lower end computers are restricted or eliminated. Second, the ES 431 needs to be supported via the operating system (OS) of the workstation computer 433. ES are complex software systems and are generally not portable, restricting the OS 433 that may be used on the hosting workstation computer 430. Third, the ES 420 needs to be pre-installed on the workstation computer 430. The tasks and responsibilities of properly installing and configuring the software components 423, 431 performing required software updates and managing licenses requires considerable time and effort resulting in greater costs. Finally, the ES version 423 must be compatible with the system software for the PLC 410 including the engineering service 411 and PLC operating system 413. If the two systems are not compatible, one or both software systems must be updated before engineering tasks may be carried out. This process also requires substantial time and effort resulting in greater costs.

Presently, the above limitations are attempted to be managed through increased effort and time. Typically, complex configuration management must be constantly performed, choosing computer hardware and OSs for engineering tasks such that ES requirements are met and that compatible versions of the ES are installed on these machines. Further, effort must be expended to ensure that software versions of the ES and PLC are in sync. These efforts create additional administrative overhead, which over large complex organizations becomes complicated and burdensome. Further, despite the additional effort, other challenges arise which make the present solutions ineffective. For example, an external field technician on an onsite visit to a PLC system may carry a portable workstation, in which the installed ES 420 is not compatible with the PLC 410. It would be beneficial to allow a technician to attach a low-end portable computer to a PLC to verify a control program. Moreover, an engineer may walk about a plant carrying a mobile tablet computer. It would be convenient and cost effective if the mobile tablet computer could connect to PLCs within the plant to allow the engineer to carry out simple engineering tasks. In a scenario, a new relatively simple plant is brought online, requiring only a single PLC. A solution that allows for a new PLC to be connected, configured, programmed and commissioned onsite in minutes using a conventional laptop computer is desired.

SUMMARY

A system for configuration and control of a device includes a device processor comprising at least two processing cores and a device firmware executed by a first processing core of the at least two processing cores. A device-based engineering server is executed on a second processing core of the at least two processing cores for performing engineering services related to configuration and control of the device. According to embodiments, a web server runs on the device-based engineering server including a webApp for performing web-based functionality for configuration and control of the device. The webApp may be downloaded from the web server to the user's web browser. According to embodiments, a repository of engineering business logic is in communication with the device-based engineering server. According to embodiments a hypervisor configured to manage communication between the device firmware and the device-based engineering server. A communication path established in the hypervisor for communicating a configuration or control instruction to the device firmware. According to aspects of some embodiments, the configuration or control instruction is initiated by a user via a web browser in communication with the web server running on the device-based engineering server. The user's web browser may run on a computer workstation that does not otherwise meet processing requirements of an engineering system for the device.

According to some embodiments, a second web server executes within the device firmware. The second web server is in communication with the device runtime system and may receive a request from a user via the user's web browser and provides real-time information about the device to the user via the user's web browser. The device may be a programmable logic controller.

According to a method of configuration or programming of a device having a processor and at least two processing cores within the processor: a first processing core of the processor executes a runtime system for the device, and a second processing core executes an engineering system for configuration or programming of the device. The second processing core may also execute a device-based engineering server, the device-based engineering server hosting a first web server. The first web server may host a device-based engineering webApp and device-based engineering web services. In some embodiments, a repository of device-based engineering business logic is stored in data communication with the device-based engineering server executing on the second processing core. According to embodiments, the webApp is downloaded to a user's web browser in response to a request from the user to perform engineering tasks relating to the device. The web app may include a graphical user interface (GUI) downloaded on the user's web browser, the GUI offers features found in an engineering system. According to embodiments, the device is a programmable logic controller (PLC) and the GUI is configured to offer at least one of: browsing a PLC configuration, opening function and data blocks of the PLC, viewing parameters or program code, editing parameters and program code, and compiling and activating configuration or program code of the PLC.

Methods according to embodiments described herein may further execute a second web server on the first processing core. The second web server may download information relating to execution of the PLC including monitoring and diagnostics services to a user's web browser.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

A novel approach and architecture for an ES that overcomes the limitations described above will now be described. The approach may be referred to as "Device-based Engineering (DbE)") and has a major goal of integrating the ES functionality on the device that is the object of the engineering tasks itself.

Figure 1:
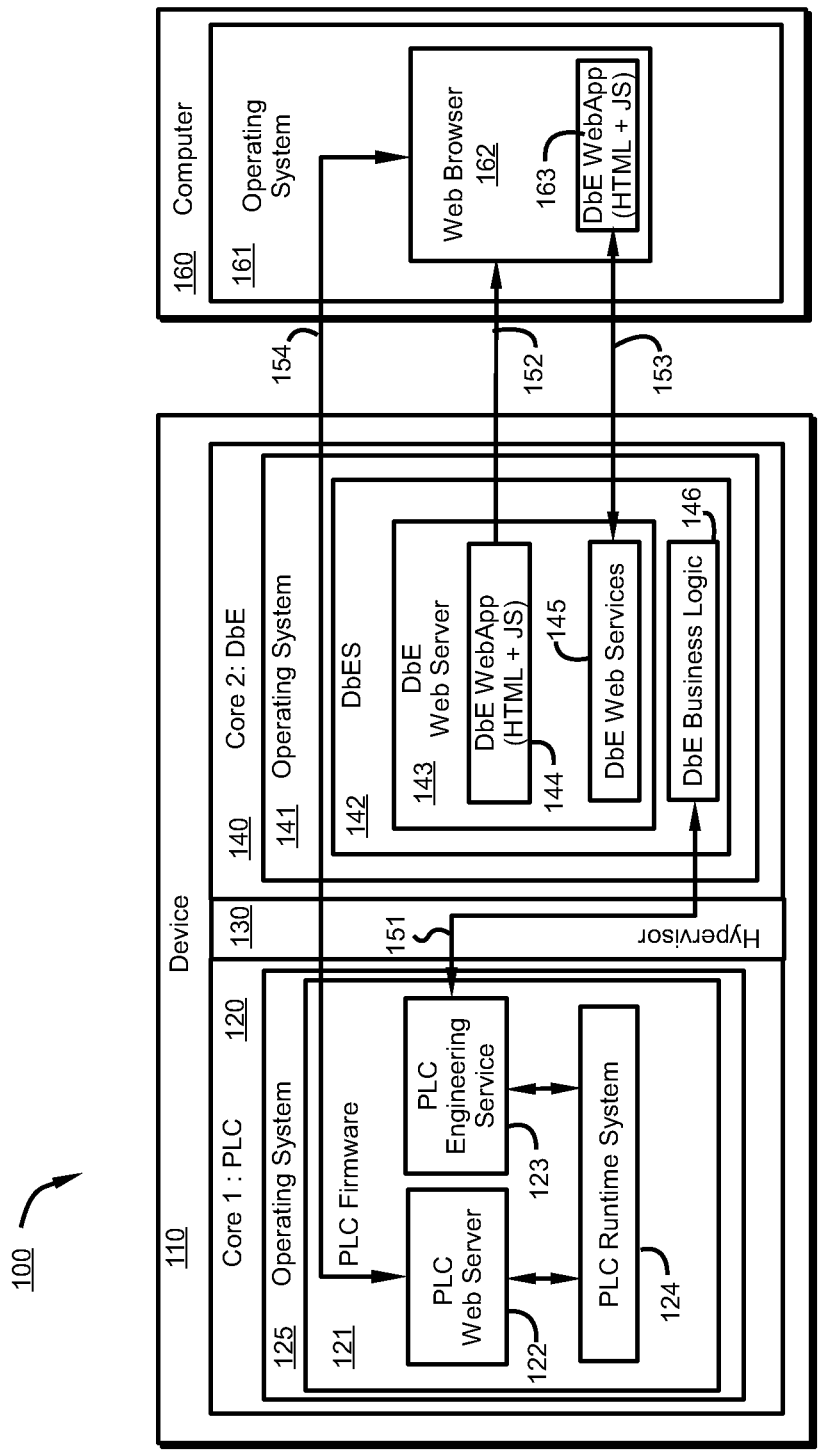
FIG. 1 is a block diagram of an architecture for device-based engineering according to aspects of embodiments described in the present disclosure.

FIG. 1 is a block diagram illustrating an architecture 100 of a DbE system according to aspects of an embodiment of this disclosure.

DbE relies on the following technical elements:

A device 110 having a multicore processor 120, 140 a hypervisor 130 providing isolation of the processor cores 120, 140 and allowing each core to execute an individual instance of an operating system 125, 141. In an embodiment, a first processing core 120 may operate a first operating system, while a second processing core 140 may operate a second operating system 141 different than the first operating system.

PLC firmware 121 is executed on a first processing core 120 of the device 110.

An operating system 141 running on a second processing core 140 is used by a DbE server (DbES) 142.

A communication channel 151 is maintained between the first processing core 120 and the second processing core 140 via the hypervisor 130.

An external computer or workstation 160 having an operating system 161 and standard web browser 162 independent of the first processing core 120 and the second processing core 140. The web browser 162 is assumed to support standard web applications 163 including hyper-text markup language (HTML) and/or JAVASCRIPT (js) and other communication protocols and file formats. Those of skill in the art will recognize that any protocol or format may be used alone or in combination to implement various aspects of embodiments described herein.

The DbE system 100 comprises a DbE server 142 that executes on the device 110, and a DbE Web Application (WebAPP) 144 that executes within the web browser 162 of the client computer 160. In turn, the DbES 142 includes two main components: the DbE Business Logic 146 that contains all the engineering functionality of the system (e.g., device information, object models, programming language elements, compilers, code generators, and communication libraries), and the DbE Web Server 143 that provides access 153 to WebApp 144 and to DbE Web Services 145 from an external computer or workstation 160. The DbE WebApp 144 is initially stored in the DbE Web Server 143 and is downloaded 152 to the client computer 160 for execution by the web browser 162.

The DbE architecture 100 functions by allowing the OS 141 hosting the DbES 142 to run on the PLC device 110 along with the PLC firmware 121, while the hypervisor 130 allows for these components to operate independently of one another. Users may employ web browser 162 to connect to the DbE Web Server 142 running on the PLC device 110. The web browser 162 loads the DbE WebApp 144 and starts its execution. The WebApp 144 presents a graphical user interface (GUI) offering features frequently found in ES (e.g., browse PLC configuration and programs, open function and data blocks, view and edit parameters and program code, compile and activate configuration and program code). The engineering functionality provided in the WebApp 144 is implemented by on-demand invocations to the DbE Web Services 145, which are realized in the form of asynchronous JAVASCRIPT and XML HttpRequest (AJAX) calls (e.g., using JAVASCRIPT object notation (JSON) as a data format). Calls to the DbE Web Services 145 are routed to the DbE business logic 146, which includes code or commands to perform corresponding functions of the ES. DbE business logic 146 performs similar functionality as prior known techniques for ES, for example, parameter changes, adding or removing variables, modifying programs, and/or checking and compiling code.

To download configuration and programming information to the PLC and activate them, the DbES 142 uses an internal communication channel 151 in the hypervisor 130 for communicating with the PLC. Communication with the PLC is concrete through the PLC Engineering Service 123 in the PLC firmware 121. This communication is analogous to prior means of communicating with the PLC engineering service through an external communication network.

The downloaded and activated configuration and program information is executed by the PLC runtime system 124 in a conventional manner. The architecture of FIG. 1 allows a user to use the WebApp 144 to monitor the execution of the PLC 120, and to connect directly 154 to the PLC firmware 121 from a web browser 162. This ability is provided by a PLC web server 122 running on the PLC firmware 121 to provide monitoring and diagnostic services.

Figure 2:
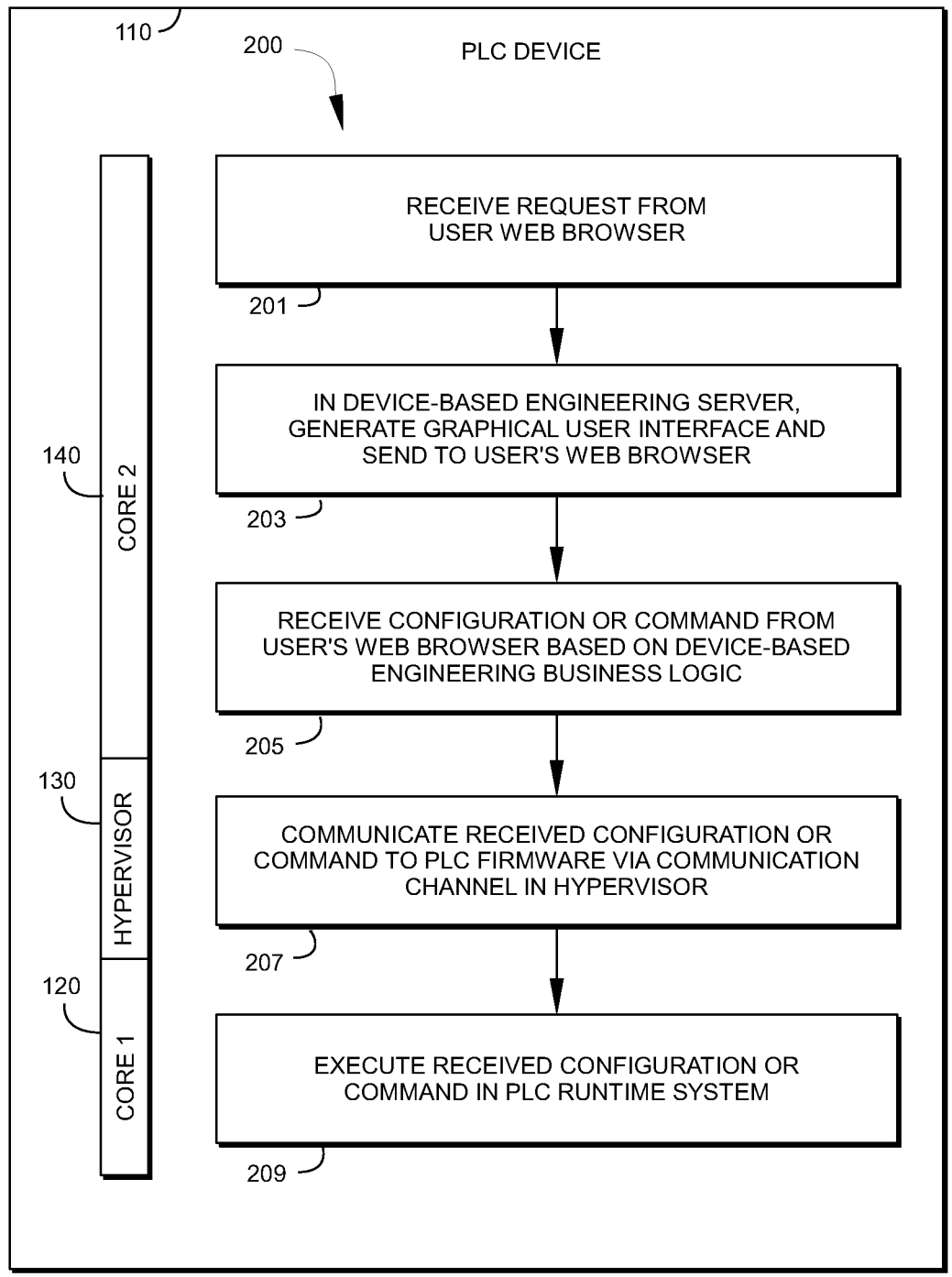
FIG. 2 is a block diagram including a process flow diagram of a method for device-based engineering according to aspects of embodiments described in the present disclosure.

FIG. 2 is a block diagram including a process flow diagram depicting a method for device-based engineering according to aspects of embodiments of the present disclosure.

The method 200 occurs within the perspective of a device 110. Device 110 may be a PLC by way of example. Device 110 includes a processor having at least two processing cores 120, 140. Some steps in the method 200 are executed by processing Core1 120 while other steps of method 200 are performed by processing Core2 140. Communication between Core1 120 and Core2 140 is enabled by hypervisor 130. The method 200 begins with a web server running on Core2 140 receiving a configuration or command for device 110 from a web browser run by a user 201. The command is received by a device-based engineering server, more particularly, a web server housed by the DbES. The web server receives the command and in response to the command generates results corresponding to the command. The web server 143 provides the results to the webApp 144, which renders the results in a GUI and presents the GUI to the user on the user's web browser 203. Through the GUI, the user indicates a configuration or operation command that the user wishes to execute on the device 110. The configuration or operations command is based on business logic stored and maintained within the DbES. The configuration or operations command is received at the DbES 205. The command received by the DbES is then forwarded to the PLC runtime within the PLC firmware. The command is communicated to the PLC firmware through a communication path established by the hypervisor 207. The command is then executed in the PLC runtime system 209.

The method 200 allows a user to communicate with a PLC engineering system using a web browser. Accordingly, communications and operations may be carried out without regard to the configuration and operating system of the workstation being used due to the communication of instructions being performed on a web browser. This provides improvements over prior art systems, which required minimum processing requirements and software compatibility between disparate workstations. For example, software implementing engineering system processing on the engineering system needed to be compatible with the version running on the user's workstation or computer. Likewise, the operating systems running the engineering system applications between stations and the PLC needed to be compatible. These concerns are eliminated by providing an engineering system that is located within the device being controlled. The runtime for the device (e.g., PLC) is hosted on one processing core within the device while a device-based engineering system is hosted on the device in a second processing core.

Figure 3:
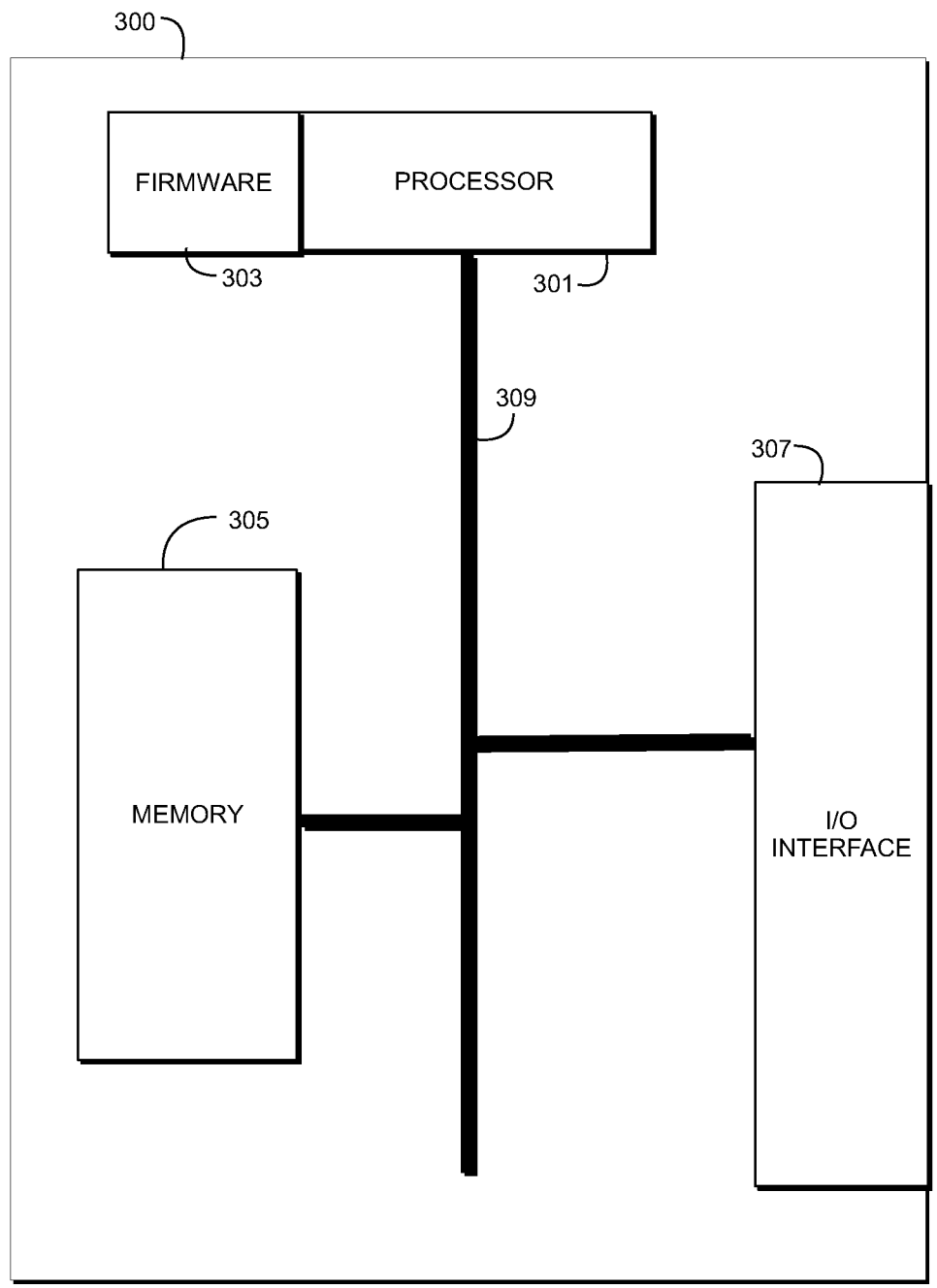
FIG. 3 is a block diagram of a processing device for deployment of a device-based engineering system that may be used to implement systems and methods according to embodiments described in this disclosure.
Figure 4:
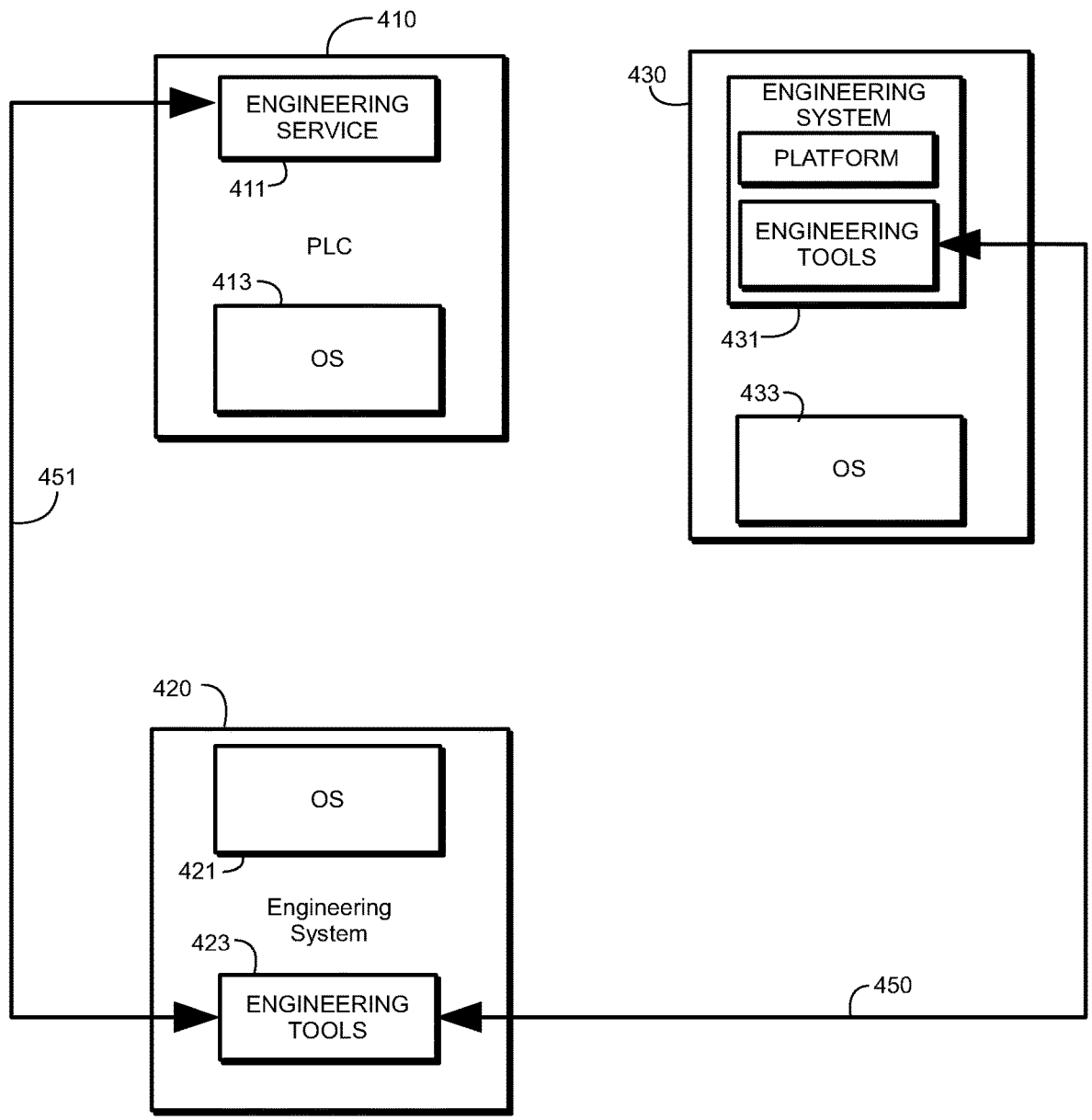
FIG. 4 is a block diagram of a prior art system implementing an engineering system of a PLC.

FIG. 3 illustrates an exemplary processing device 300 within which embodiments of the invention may be implemented. Processing device 300 includes a processor 301 for executing instructions. Processor 301 may include memory associated with the processor 301 for storing executable instructions defining firmware 303 of the processor 301. Processor 301 may be in communication with additional memory 305 via a communications bus 309. Memory 305 and processor 301 may be in further communication with input/output interface 307 via the communications bus 309. The I/O interface may provide one or more input and output ports which receive information from external devices via the input ports and provide information to external devices via the output ports. Inputs may include information relating to states within the system, including measurement values from sensors (e.g. position sensors, temperature sensors, image information from image sensors). Outputs may include values or commands that serve as inputs to other processors associated with external devices, or to provide control signals to actuators for controlling devices such as valves or switches associated with external devices.

An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine-readable instruction, sub-routine, or other distinct section of code or portion of an executable application for performing one or more processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

What is claimed is:

1. A system for configuration and control of a device comprising:
   a device processor comprising at least two processing cores, the device processor configured to control a physical equipment system;
   a device firmware executed by one of the at least two processing cores;

a device-based engineering server executed on another one of the at least two processing cores independent of the device firmware for performing engineering services related to configuration and control of the device;

a hypervisor configured to manage communication between the device firmware and the device-based engineering server;

a communication path established in the hypervisor for communicating a configuration or control instruction to the device firmware; and a runtime system of the device firmware that is configured to execute the received configuration or control instruction.

2. The system of claim 1, further comprising:

a web server running on the device-based engineering server; and a webApp for performing web-based functionality for configuration and control of the device.

3. The system of claim 2, further comprising:

a repository of engineering business logic in communication with the device-based engineering server.

4. The system of claim 1, wherein the configuration or control instruction is initiated by a user via a web browser in communication with a web server running on the device-based engineering server.

5. The system of claim 4, wherein the user's web browser is running on a computer workstation, the computer workstation not meeting processing requirements of an engineering system for the device.

6. The system of claim 1, further comprising:

a second web server executing within the device firmware and in communication with the device runtime system, the second web server configured to receive a request from a user via a web browser and to provide real-time information about the device to the user via the user's web browser.

7. The system of claim 1, further comprising:

web services for device-based engineering in communication with a web server, configured to allow a webApp to be downloaded to a user's web browser.

8. The system of claim 7, wherein the web services for device-based engineering comprises at least one of hypertext markup language and JAVASCRIPT.

9. The system of claim 1, wherein the device is a programmable logic controller.

10. A method of configuration or programming of a device having a processor and at least two processing cores within the processor, comprising:

in a first processing core of the processor, executing a runtime system for the device;

in a second processing core, executing an engineering system for configuration or programming of the device; and communicating a configuration or control instruction from the second processing core to the first processing core through a hypervisor, the runtime system being configured to execute the received configuration or control instruction.

11. The method of claim 10, further comprising:

on the second processing core, executing a device-based engineering server, the device-based engineering server hosting a first web server.

12. The method of claim 11, further comprising:

hosting on the first web server, a device-based engineering webApp and device-based engineering web services.

13. The method of claim 12, further comprising:

storing a repository of device-based engineering business logic in data communication with the device-based engineering server executing on the second processing core.

14. The method of claim 11, further comprising:

downloading the webApp to a user's web browser in response to a request from the user to perform engineering tasks relating to the device.

15. The method of claim 14, further comprising:

loading information representative of information generated by the device-based engineering server to render a graphical user interface (GUI) on the user's web browser, the GUI configured to offer features found in an engineering system.

16. The method of claim 15, wherein the device is a programmable logic controller (PLC) and the GUI is configured to offer at least one of: browsing a PLC configuration, opening function and data blocks of the PLC, viewing parameters or program code, editing parameters and program code, and compiling and activating configuration or program code of the PLC.

17. The method of claim 11, wherein the device comprises a programmable logic controller (PLC).

18. The method of claim 17, further comprising:

executing on the first processing core, a second web server.

19. The method of claim 18, further comprising:

downloading via the second web server to a web browser of a user, information relating to execution of the PLC including monitoring and diagnostics services.

* * * * *